H. J. CHILTON.
BOTTLE WASHING MACHINE.
APPLICATION FILED JAN. 3, 1910.

1,053,903.

Patented Feb. 18, 1913

H. J. CHILTON.
BOTTLE WASHING MACHINE.
APPLICATION FILED JAN. 3, 1910.

1,053,903.

Patented Feb. 18, 1913.

Witnesses
Walton Lenoir
F. L. Belknap

Inventor
Henry J Chilton
By Offield, Towle, Graves & Offield
Attorneys.

UNITED STATES PATENT OFFICE.

HENRY J. CHILTON, OF CHICAGO, ILLINOIS, ASSIGNOR OF ONE-HALF TO JOHN H. ROBERTS AND GEORGE W. ROBERTS, BOTH OF CHICAGO, ILLINOIS.

BOTTLE-WASHING MACHINE.

1,053,903.

Specification of Letters Patent.

Patented Feb. 18, 1913.

Application filed January 3, 1916. Serial No. 536,013.

*To all whom it may concern:*

Be it known that I, HENRY J. CHILTON, a citizen of the United States, residing in the city of Chicago, county of Cook, and State of Illinois, have invented certain new and useful Improvements in Bottle-Washing Machines, of which the following is a specification.

This invention relates to improvements in bottle washing machines, and refers more particularly to a machine of that character commonly known as a rotary washer.

Among the salient objects of the invention are to provide a construction in which a series of bottles are carried by an endless traveling conveyer to the washing apparatus and there rotated synchronously with the latter; to provide a construction in which both the interior and exterior of the bottles, as well as the mouth and the bottom of the latter, are effectively washed, and these operations carried on successively without interrupting the drive of the bottle carrier or conveyer; to provide a construction in which the interior of each bottle as the latter is carried in the conveyer is subjected to a double washing, thus permitting the use of different characters of brushes if desired; to provide a construction in which the bottles after they are washed are automatically rinsed while still carried by the conveyer; to provide a construction in which water is admitted to the brushes and rinsing apparatus at predetermined intervals through automatically controlled valve-mechanisms; to provide a construction in which the bottles are automatically spun within their holders while being washed; to provide a construction in which the bottles and the brushes which wash the interior are automatically brought into and out of alinement in order to permit the use of two or more brushes for washing the interior of each bottle; to provide a construction the various operating parts of which may be adjusted to permit the washing of different sizes of bottles in the same machine; to provide a construction in which the various operating parts are actuated automatically and in properly timed relation with each other; to provide novel means for shifting the rinsing mechanism into and out of proper alinement with the bottles; to provide a construction in which substantially all of the various mechanisms may be driven from a common source of power; to provide a construction in which the operating mechanisms are in the main actuated by cams, thus insuring a more positive and reliable operation; to provide a novel type of conveyer mechanism for holding the bottles during their travel around the washing apparatus; and in general to provide an improved construction of the character referred to.

The invention consists in the matters hereinafter described, and more particularly pointed out in the appended claims.

In the drawings, Fig. 7' is a plan view of the same.

Figure 2:
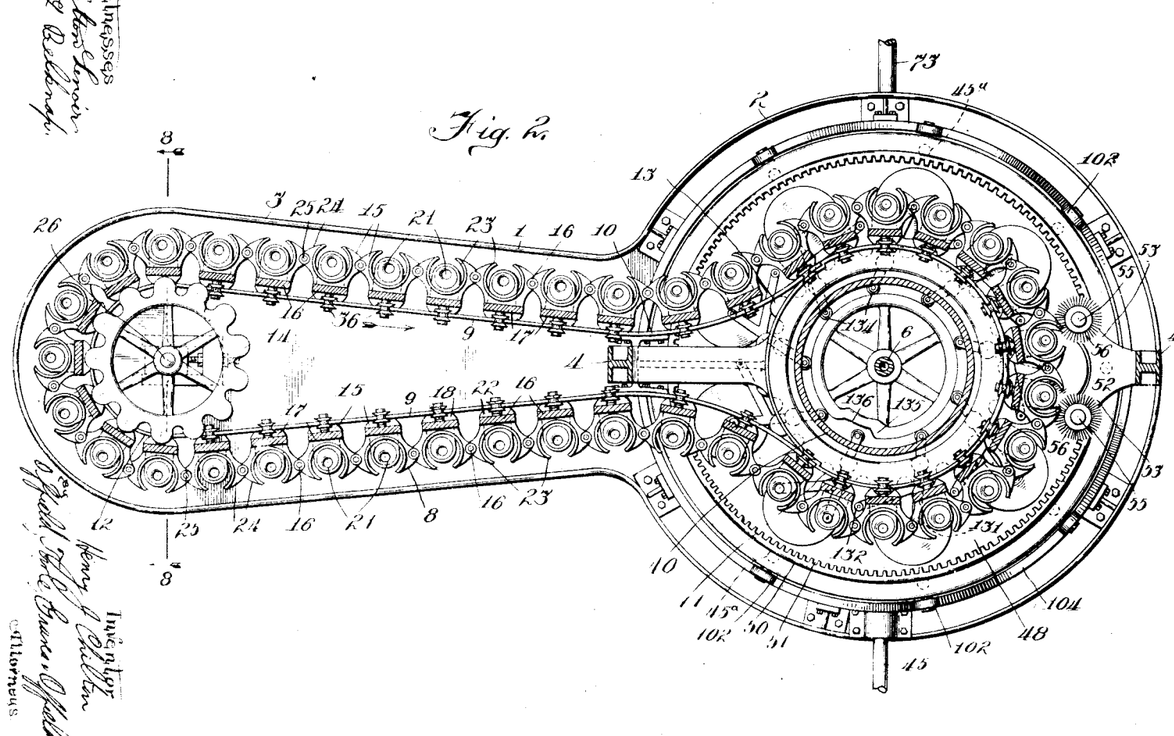
Fig. 2 is a horizontal sectional view taken on lines 2—2 of Fig. 1 and looking in the direction of the arrows.

Referring to the drawings, 1 designates as a whole a main base casting having a circular main portion 2 and an elongated extension 3. The central portion 2 of this casting is provided with vertical standards 4—4, and a cross support 5 between which and the base is journaled a vertical shaft 6. The extension 3 is similarly provided with a standard 7 which supports the outer end of the conveyer, designated as a whole by 8. Upon this standard 7 and the main upright frame is suitably supported a conveyer track 9, which, as shown in Fig. 2, is of peculiar configuration, converging at its central portion as shown at 10, extending around the rotary washing apparatus as shown at 11 and narrow at its outer end as shown at 12. Upon a drum 40, hereinafter described, are keyed sprockets 13 which mesh with and drive the conveyer, in a manner hereinafter more particularly described. The outer end of the conveyer is trained around a somewhat similar idler sprocket 14 suitably journaled in the standard 7.

Figure 6:
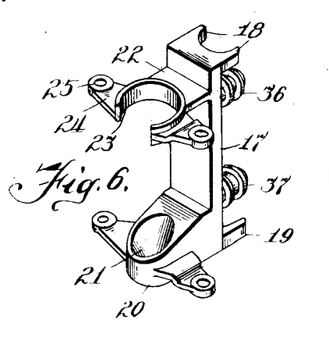
Fig. 6 is a detail perspective view of one of the bottle holders.
Figure 7:
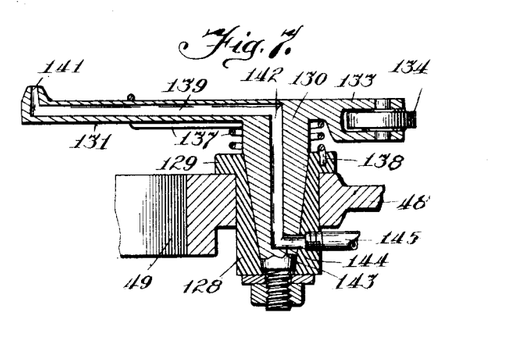
Fig. 7 is a vertical sectional view of a portion of the rinsing apparatus.
Figure 8:
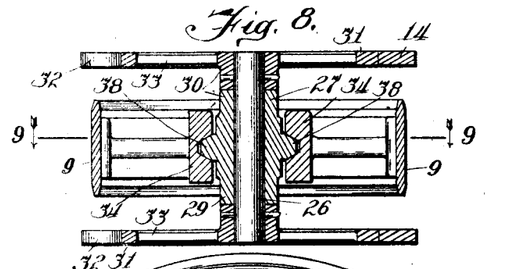
Fig. 8 is an enlarged, vertical sectional view taken on lines 8—8 of Fig. 2 and looking in the direction of the arrows.
Figure 9:
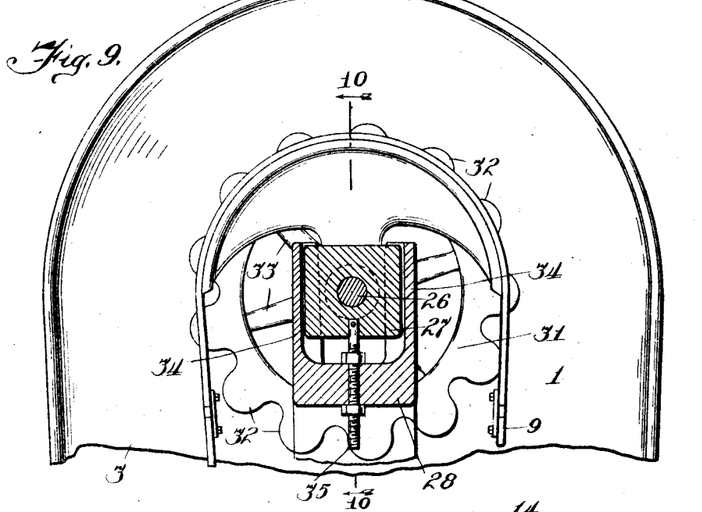
Fig. 9 is a horizontal sectional view taken on lines 9—9 of Fig. 8 and looking in the direction of the arrows.
Figure 10:
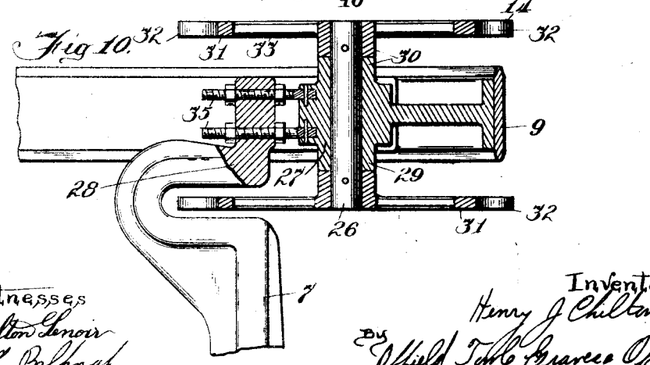
Fig. 10 is a vertical sectional view taken on lines 10—10 of Fig. 9.
Figures 11, 12, 13, 15, 16:
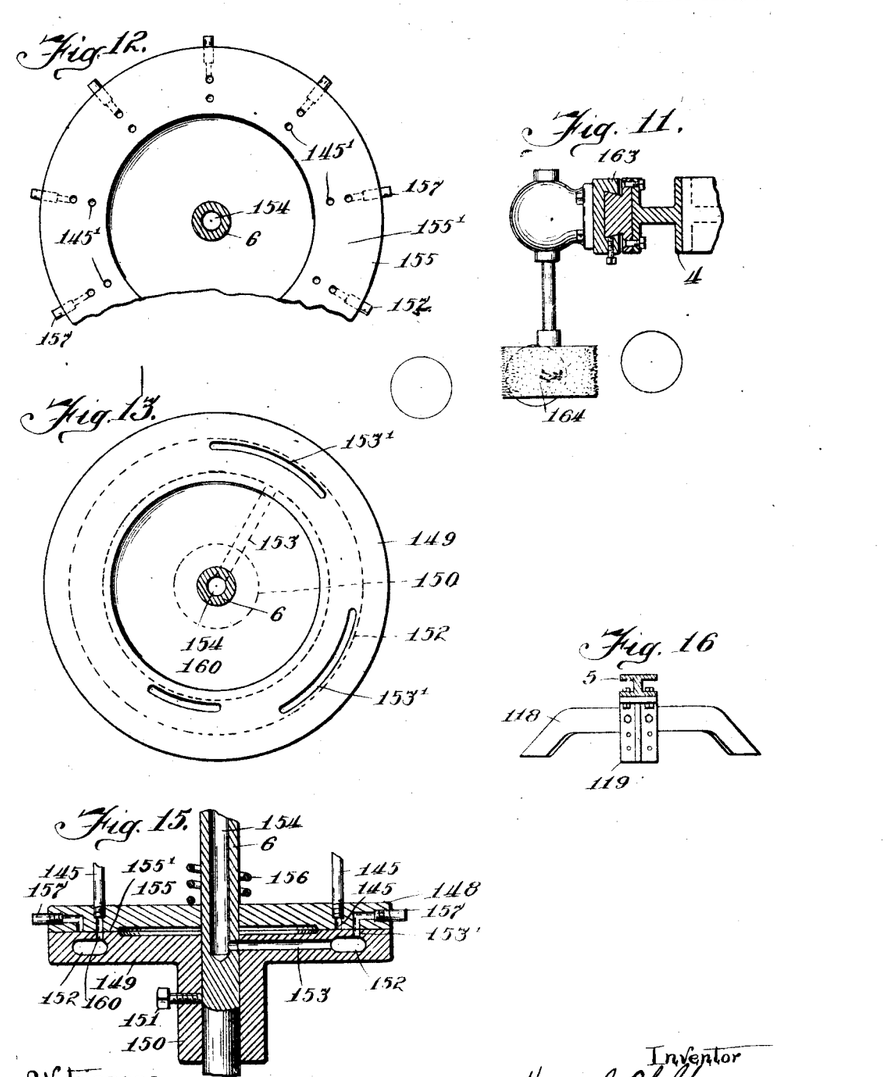
Fig. 11 is a horizontal sectional view of the mechanism for washing the bottom of the bottles, the view being taken approximately on line 11—11 of Fig. 1.
Fig. 12 is an enlarged, vertical sectional view of the upper casting of the valve chamber which controls the supply of water to the brushes and rinsing mechanism.
Fig. 13 is a top plan view of the lower half of the same.
Fig. 15 is a vertical, sectional view of the main valve chamber.
Fig. 16 is a detail view of the cam track upon which the spinners ride.

Describing now more particularly the construction of the conveyer, it comprises a series of links 15 which are pivotally connected together chain fashion, as shown at 16. Each of these links (see Fig. 6) consists of a casting 17 provided at its upper and lower edges with teeth 18 and 19 which are adapted to mesh with the sprockets 13 and 14. The opposite face of each link is provided with a lower bracket 20 having a bottle seat 21 to receive the neck of the bottle, and a generally similar bracket 22 having a split collar 23 which holds the lower end of the bottle. It is understood, of course, that the bottles are carried in the conveyer in inverted position. Each of these brackets 20 and 22 is provided at each side with an ear 24 having an eye 25 by which the links are connected together. The rear ends of the links are provided with spaced-apart rollers 36 and 37, which ride upon the respective upper and lower edges of the track.

From the foregoing it will be seen that I provide simple means for holding the bottles securely within the conveyer, and at the same time obtain a particularly strong construction for the conveyer itself.

Referring now to the construction of the idler sprocket 14, it consists of a journal 26 mounted in a suitable sliding block 27 carried by a bracket 28 mounted on the standard 7. The block 27 is provided with extensions 29 in order to form bearing surfaces for the hubs 30 which carry the sprocket rings 31 having sprocket teeth 32. The rings are connected to the hubs by spokes 33. The upper and lower sprocket rings are so arranged as to register with the respective upper and lower teeth 18 and 19 of the conveyer links. In order to adjust the sprocket 14 within its bearings, the block 27 is slidably mounted between a pair of forked arms 34 forming a part of the bracket 28. The block may be locked in adjusted position by means of a set screw 35. The block is guided within the arms 34 by means of suitable lugs 38 sliding in suitable grooves formed in the arms 34. The driving sprockets 13 are fixed, as shown at 39, to a drum 40 extending around the stationary shaft 6. This drum rotates with the washing apparatus as a whole, thus driving the conveyer.

Around the lower part of the shaft 6 is loosely mounted a relatively large disk 42 provided at its lower edge with gear teeth 43 which mesh with a spur gear 44 carried by a horizontally extending countershaft 45, which may be driven from any suitable source of power. This disk 42 supports the rotating apparatus as a whole. To this end it is provided with a plurality of posts 45ª extending around its periphery. The upper ends of these posts are connected together by a circular casting 46. To the stationary shaft 6 is keyed a collar 47 which supports a disk 48. At its outer edge, this disk is provided with a series of apertures 49 for a purpose hereinafter described. On the outer edge of the disk is integrally formed an annular, upstanding flange 50 provided at its inner edge with an internal gear ring 51. Upon the main frame is secured an inwardly-extending bracket 52 having a pair of arms 53 at its upper and lower ends, respectively. Each of these arms terminates in a bearing 54, and within each pair of bearings is journaled a brush rod 55 carrying a suitable brush 56. The lower end of each of these rods is provided with a gear 57 which meshes with the internal gear ring 51. The pair of brushes 56 are adapted to wash the exterior of the bottles as they travel by in their conveyer, and as the gear ring 51 is rotated with the main body of the machine, the brushes are spun in their bearings in such a manner as to effectively wash the exterior of the bottles, as shown more clearly in Fig. 1.

Describing now the mechanism for washing the interior of the bottles,—within the apertures 49 of the disk 48 are seated cap members 58 which are connected to vertically-extending rods 59, the lower ends of which are seated in cylinders 60 and 61, respectively. Extending between the rods 59 is a drive shaft 62, which likewise extends through the cylinders 60 and 61. This shaft is rotatably mounted in its bearings, and at its lower end is provided with an extension 66 carrying a gear 67. The gears 67 are driven from a common gear disk 68 extending around the shaft and loosely supported upon a suitable bearing upon the upper face of the main drive disk 42. This gear disk 68 is secured by a set screw as shown at 69, on a sleeve 70 which is mounted between the stationary shaft 6 and the disk 42. This sleeve is provided at its lower end with a bevel gear 71 driven by a spur gear 72 carried by the horizontally extending countershaft 73. The latter may be suitably driven from the same source of power as the countershaft 45, heretofore referred to. The arrangement is such, however, that the various shafts 62 are driven at a much higher rate of speed than the main disk 42.

Figure 3:
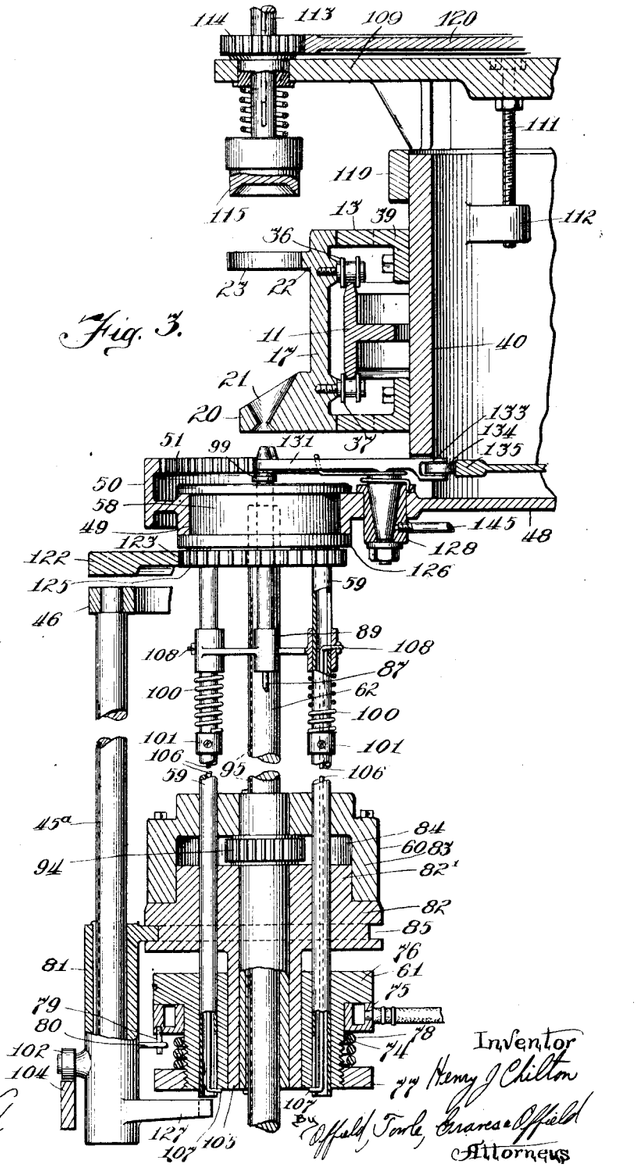
Fig. 3 is a vertical sectional view, showing more particularly the apparatus for washing the inside of the bottles.

Describing now the cylinders 60 and 61, the latter comprises a circular casting 74 provided at its upper edge with an offset flange 76 and at its lower edge with a collar 77 which is screw-threaded to the casting 74, as shown more clearly in Fig. 3. Upon this collar 77 is mounted a coiled expansion spring 78, and between the upper edge of the spring and the flange 76 is loosely mounted a channeled ring 75, into which water for the inner brushes is admitted in the manner hereinafter described. For a purpose hereinafter described, the channeled ring 75 is limited against rotary movement independent of the rotation of the device as a whole by means of a pin or pins 79 extending through the bracket arms 80 carried by collars 81 slidably mounted on the posts 45ᵃ. The main purpose of these collars 81 is to reciprocate the cylinders 60 and 61. The upper cylinder 60 comprises a lower casting 82 having at its upper end a reduced extension 82′, over which fits a closure cap 83 in such a manner as to form a gear chamber 84. The lower end of the casting 82 is provided with an annular groove 85 which receives a U-shaped forked arm 86 carried by the corresponding collar 81. The respective cylinders 60 and 61 are vertically bored to receive the posts 59, the shaft 62, and a pair of brush spindles 87, 88, respectively. The upper ends of these spindles are guided in a collar 89 carried by the respective posts 59, while the lower ends extend into a packing chamber 90 formed in the upper cylinder 60. From this cylinder a pipe 92 leads to a cross duct 91 which communicates with the main water channel 75. The arrangement is such that the spindles 87 and 88 can have a movement of rotation upon their axes independent of the rotation of the main disk 42. In order to rotate the brush spindles, within the gear chamber 84 is mounted a pair of gears 93 suitably secured to the respective spindles 87 and 88. These gears are driven by a central gear 94 upon the constantly rotating shaft 62.

Figure 4:
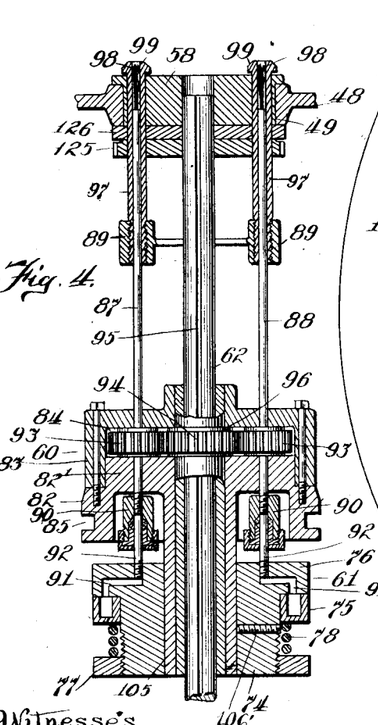
Fig. 4 is a vertical sectional view taken at right angles to Fig. 3, and showing more particularly the apparatus for raising and lowering the bottles.
Figure 5:
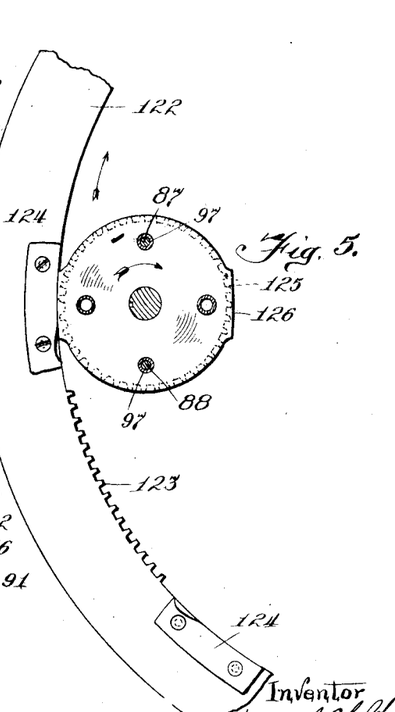
Fig. 5 is a fragmentary, horizontal sectional view showing the apparatus for shifting each pair of brushes so as to subject each bottle to a double interior washing.

It may here be noted that the spindles 87 and 88 are raised and lowered with the cylinders 60 and 61. Inasmuch, however, as the shaft 62 has no vertical movement, it is necessary to provide means for reciprocating the gear 94. To this end the shaft 62 is provided with a vertically extending spline groove 95 which receives a pin (not shown) upon the gear 94, thus permitting the latter to be shifted upon the gear, but preventing its rotation independent of the shaft. In order to insure the gear 94 being at all times in proper mesh with the gears 93, the casing is provided with shoulders 96 which fit over the ends of the central gear, as shown in Fig. 4. The upper end of each spindle extends into a tube 97 supported in the collar 89 and rigidly connected to the latter. Each of these tubes is adapted to receive the brushes 98 when the spindles 87 and 88 are shifted downwardly. The upper end of each tube 97 is provided with a central head 99 which is adapted to be shifted upwardly into engagement with the ends of the holders when the cylinder 60 and brush spindles are raised in the manner hereinafter described. In order to move the heads 99 into engagement with the holders, the collars 89 are yieldably supported by coiled springs 100 mounted on collars 101 fixed to the posts 59.

Figure 14:
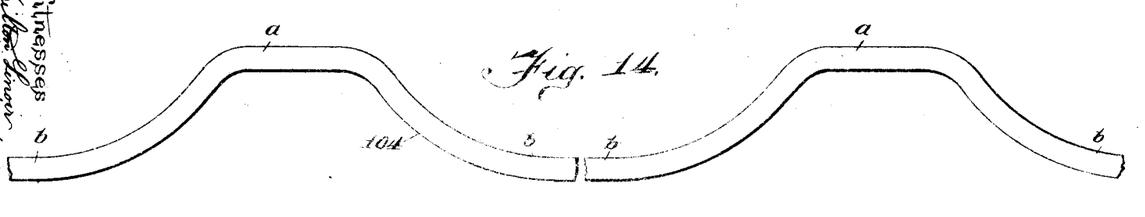
Fig. 14 is a detail view showing the manner of constructing the main operating cam by which the brushes are shifted upwardly into operative engagement with the bottles.

Referring now to the manner of shifting the cylinders to reciprocate the brush spindles, each of the collars 81 is provided at its outer side with a pair of spaced-apart cam rollers 102, 103 which ride upon a cam track designated as a whole 104. This cam track is of peculiar configuration, as is shown more clearly in Fig. 14. As the cam rollers ride over the upper part a of the track, the collars 81 are shifted upwardly, carrying with them the cylinders, by means of the forked arms 86. As the cam rollers ride down upon the lower portion b of the track, the cylinders are shifted downwardly. It may be here noted that the cylinder 60 is provided with a sleeve extension 105 which fits within the cylinder 61 and is secured thereto by means of set screws 106′. In order to return the tubes 97 to normal, within each of the hollow posts 59 is inserted a rod 106, the lower end of which is provided with a right-angled extension 107, and the upper end of which is provided with a similar extension 108 which extends through a suitable slot in the corresponding tube 59 and engages the collar 89. The object of this slot is to permit limited vertical movement of the collar and connecting rods 106. When the cylinders are shifted downwardly, the extensions 107 of the rods engage the base of the cylinder 61 and the collar is pulled downwardly, carrying the heads 99 out of engagement with the holders.

As a feature of the invention, means are provided for spinning the bottles while their interiors are being washed by the brushes. Accordingly, upon the upper end of the shaft 6 is mounted a cylindrical casting provided with a downwardly-extending flange 110 which telescopes over the drum 40. This casting is adjustably mounted on the drum, and is connected to the latter by means of screws 111 which engage suitably-threaded brackets 112 carried by the drum. In the casting 109 is mounted a plurality of rods or fingers 113 having secured thereto suitable gears 114 and provided at their lower ends with spinner heads 115. Between the lower face of the bracket and the heads 115 are mounted coiled expansion springs 116 which tend to force the spinner heads down into gripping engagement with the bottles, as shown more clearly in Fig. 1. These heads are shifted into and out of engagement with the bottles by means of cam wipers 117 carried by the upper ends of the rods 113 and riding upon a cam track 118 carried by brackets 119 fixed to the stationary main frame. During the rotation of the washing apparatus as a whole, the rods 113 are constantly spun or rotated by means of a gear disk 120 secured to the stationary shaft 6 and meshing with the respective gears 114. The arrangement is such that the bottles will be bodily spun within their holders during the process of washing, while the holders will be automatically withdrawn as the bottles travel away from the washing apparatus.

It will be noted that each pair of brushes are simultaneously washing the interiors of a corresponding pair of bottles. After this washing operation is complete, the brushes are first lowered out of the bottles and then shifted into reverse position so as to be in register with the opposite bottle of the corresponding pair which are being washed. The brushes are then again reciprocated upwardly into the bottles. The arrangement is such that the interior of each bottle is subjected to a double washing. To this end, the cam track 104 is so constructed as to shift the brushes upwardly twice during a single revolution of each cylinder around the cam track. During that part of the travel of the cam rollers upon the lower cam surfaces $b$, the cylinders 60 and 61 are rotated on their own axes so as to reverse the position of the bottles. Accordingly, to the stationary main frame is secured, by means of brackets 121, a ring 122 having a segmental toothed gear 123 at its inner periphery; the construction being in effect a mutilated gear. At either end of this gear upon the ring 122 is fixed a locking block 124. To each of the heads 58 is secured a gear 125 having at either side flat surfaces 126. As each of the gears 125 rides by the segmental gear rack 123, it is rotated, thus shifting the rods 59 into reverse position. After each gear 125 has passed out of engagement with the rack 123, the flat surface 126 rides upon the lock block 124 and effectively locks the cylinders and rods 59 against rotation upon their axes. At this time the rollers of certain of the collars 81 have ridden upon the upper part of the cam 104. Each of these collars 81 is provided at its lower end with a forked arm 127, which as it is shifted upwardly engages the lower end of the corresponding rod 59 and locks the cylinders against rotation on their axes, even after the gears have passed out of engagement with the lock blocks 124. When the collars 81 are lowered, the arms 127 pass out of engagement with the rods 59, and the cylinders are again released. It will be remembered that the water channels 75 are fixed to the collars 81, and accordingly the former do not shift with the cylinder 60.

Figure 1:
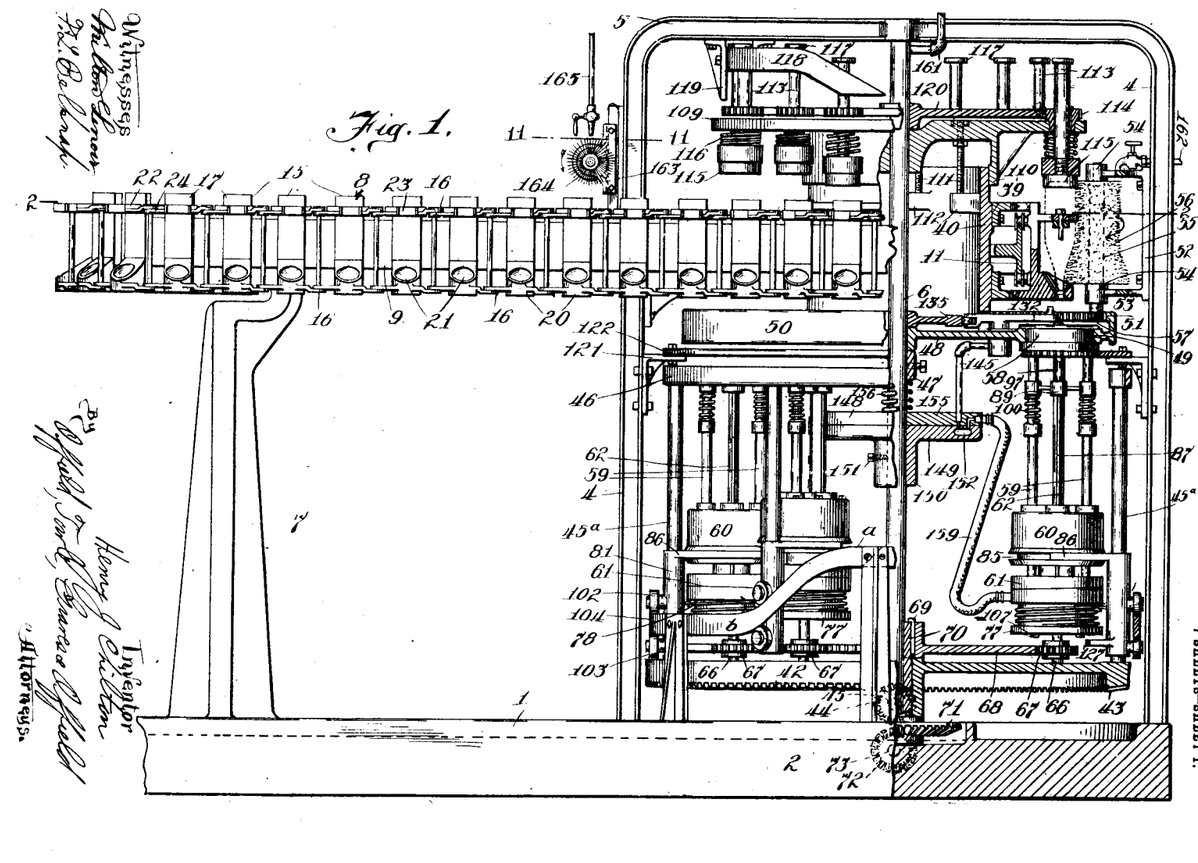
Figure 1 is a side elevation, with parts broken away and shown in section, of a rotary washing machine embodying my invention.

After the bottles have been subjected to the double washing referred to, the interior of each is rinsed or sprayed. For this purpose the casting 48 is apertured to receive a plurality of sleeves 128, each of which is confined in position by means of an annular shoulder 129. Each sleeve is bored to receive a tapered journal block 130 provided at its upper end with arms 131, 132, respectively, and also with a forked bracket 133 extending radially inwardly and carrying a cam roller 134. These cam rollers ride upon a generally-circular cam-track 135 provided with a depressed cam surface 136. The arrangement is such that the arms 131 and 132 are normally swung out of alinement with the bottles by means of the engagement of the rollers 134 with the cam 135. When the rollers, however, reach the cam surface 136, they are released and the rinser arms 131 and 132 automatically swung into alinement with the pair of bottles which are then passing. This is accomplished by means of a coiled spring 137, one end of which is connected to the journal 130, and the other end of which is connected to the shoulder 129 of the corresponding sleeve 128, as shown at 138. Each of these arms 131 and 132 is provided with water ducts 139, 140, terminating at their outer ends in upstanding spouts 141 and communicating at their inner ends with a duct or water passage 142 formed in the journal block 130. The lower end of this duct 142 is provided with a cross extension 143 which registers with a slot 144 formed in the side of the sleeve 128. This slot, however, does not extend entirely through the side of the sleeve, but communicates with a pipe 145 which leads down to a water valve chamber designated as a whole 148. This chamber comprises a disk 149 having a reduced extension 150 which is secured by a set screw, as shown at 151, to the stationary shaft 6. Within the outer end of this stationary disk 149 is formed a circumferentially-extending water-channel 152 which is connected by a cross duct 153 with a water pipe 154 seated in the stationary shaft 6. The upper face of this channel is provided with a pair of segmental outlet apertures 153', for a purpose hereinafter described. Upon the stationary disk 149 is mounted a rotating disk 155 having a bearing surface 155', which rides upon a similar bearing surface upon the lower disk. This upper disk is kept in frictional water-tight engagement with the lower one by means of a coiled expansion spring 156, the upper end of which bears against the stationary collar 47. To this disk 155 are rigidly connected the pipes 145 leading to the rinser and also pipes 159 leading to the respective water channels 75 of the cylinder 61. Preferably, the major portion of each of these pipes 159 is flexible, as shown in Fig. 1. The upper end of each pipe 159 communicates with a duct 157 which registers at predetermined intervals with the ports 153' of the main water channel 152. Similarly, the lower ends of the pipes 145 communicate with ducts 145', there being one of these ducts for each pipe 145. These latter ducts are also adapted to register at predetermined intervals with a segmental slot 160 which communicates with the main channel 152. The arrangement is such that the pipes 145 are supplied with water through the port 160 only when the rinser arms are swung into register with the passing bottles. Water may be supplied to the main pipe through any suitable branch 161 leading to any source of supply.

From the foregoing it will be seen that water is supplied to the interior brushes and to the rinser only when the latter are in operative engagement with the bottles. At all other times the water supply is cut off. Water may be supplied to the brushes 56 through a pipe 162, as shown in Fig. 1.

As an auxiliary feature of the invention, I provide means for washing the bottom of the bottles. To this end, upon the stationary main frame is secured, by means of a bracket 163, a brush 164 which is rotatably journaled in the bracket. This brush is supplied with water from a pipe 165, and as the bottles pass they come into frictional engagement with this brush in such a way as to effectively clean the bottom of the bottles.

I claim as my invention:

1. In a bottle washing machine, the combination with a rotary main frame, of bottle washing apparatus rotating therewith, an endless traveling conveyer rotating around said main frame and leading to points remote therefrom, bottle holders carried by said conveyer, and means for operating said parts in properly timed relation.

2. In a bottle washing machine, the combination with a rotary main frame, of an endless conveyer traveling around said main frame, and leading thence to points remote from said main frame, means for continuously driving said conveyer, bottle holders carried by the conveyer, mechanism for washing the exterior and interior of the bottles, and means for actuating said various mechanisms in properly timed relation.

3. In a bottle washing apparatus, the combination with a rotary main frame, of a conveyer traveling with said main frame, bottle holders carried thereby, means for continuously driving said conveyer and main frame, bottle washing apparatus carried by the latter, whereby the bottles are washed during the uninterrupted travel of said conveyer, and means for actuating said various mechanisms in properly timed relation.

4. In a bottle washing machine, the combination with a rotary main frame, of bottle washing apparatus rotating therewith, bottle carriers continuously rotating around said main frame, and means for actuating said various mechanisms in properly timed relation whereby the bottles are washed during the uninterrupted travel of said carriers.

5. In a bottle washing machine, the combination with a rotary main frame, of an endless conveyer provided with a plurality of bottle holders rotating around said main frame and leading thence to points remote therefrom whereby only a portion of the bottles travel around the main frame at a given time and means for washing the bottles during the rotation of said main frame.

6. In a bottle washing machine, the combination with an endless traveling conveyer, of a rotary main frame, around which a lap of said conveyer travels, bottle holders carried by a conveyer, and bottle washing apparatus continuously rotating with said main frame, and means for continuously operating said parts whereby the bottles are washed during an uninterrupted travel of the conveyer.

7. In a bottle washing machine, the combination with a stationary supporting frame, having an elongated extension, a rotary frame, mounted in said supporting frame, a journal member concentric with the rotary frame, a second journal member mounted in the outer end of said extension, an endless traveling conveyer trained around said journals, bottle holders carried by the conveyer, washing apparatus carried by the rotary frame, and means for actuating said parts in properly timed relation to wash the bottles during the uninterrupted travel of the conveyer.

8. In a bottle washing machine, the combination with a rotary main frame, of brushes rotating with said main frame, bottle carriers traveling around said main frame, and means for subjecting the interior of the bottles to a double washing during the uninterrupted travel of the carriers.

9. In a bottle washing machine, the combination with a rotary main frame, of a series of brush spindles rotating with said frame, a brush and driving gear for each spindle, a common driving gear on the main frame and having driving engagement with the brush gears, bottle holders traveling around said main frame, means for bringing said brushes and bottle holders into operative engagement and means for actuating said parts in properly timed relation.

10. In a bottle washing machine, the combination with a rotary main frame, washing apparatus rotating therewith, bottle holders traveling around said frame, a series of spinners for rotating the bottles within their holders during their operation of washing, a gear carried by each spinner, a common driving member having operative engagement with the respective gears and means for operating said various parts in properly timed relation.

11. In a bottle washing machine, the combination with a rotary main frame, washing apparatus rotating therewith, bottle holders traveling around said main frame, reciprocatory spinners traveling with said main frame, and adapted to rotate the bottles within their holders at predetermined points in the travel of the latter, means for automatically reciprocating said spinners into and out of engagement with the bottles and means for actuating said parts in properly timed relation.

12. In a bottle washing machine, the combination with a rotary main frame, brushes rotating with said frame, bottle holders traveling around said frame, means for washing the interior and exterior of the bottles and rinsing said bottles during the rotation of the holders around said frame.

13. In a bottle washing machine, the combination with a rotary main frame, brushes rotating with said main frame, bottle holders traveling around said main frame, means for washing the interior of each bottle with two separate brushes during the travel of the holders around said frame, and means for actuating said parts in properly timed relation.

14. In a bottle washing machine, the combination with a main frame, of bottle holders traveling around said frame, means for washing the interior of the bottles during the travel of the holders, mechanism for rinsing the interior of the bottles after the latter have been washed, means for shifting said rinsing mechanism into and out of alinement with the bottles, and means for actuating said parts in properly timed relation.

15. In a bottle washing machine, the combination with a rotary main frame, bottle holders traveling around said frame, mechanism for washing the interior of the bottles, mechanism for rinsing said bottles, means for bringing said latter mechanisms into operative engagement with the bottles at predetermined intervals, means for shifting the rinsing mechanism into and out of alinement with the bottles and means for actuating all of said parts in properly timed relation.

16. In a bottle washing machine, the combination with a rotary main frame, of a plurality of brushes traveling with said main frame, a common water chamber concentric with said main frame, means for supplying water to the respective brushes from said chamber at predetermined intervals, bottle holders traveling around said main frame, means for bringing the said brushes and holders into operative relation, and means for actuating said parts in properly timed relation.

17. In a bottle washing machine, the combination with a rotary main frame, washing apparatus rotating therewith, traveling bottle holders, a series of spinners for rotating the bottles within their holders during the operation of washing, means for bodily adjusting said spinners whereby they may be used with bottles of various sizes, and means for actuating said parts in properly timed relation.

18. In a bottle washing machine, the combination with a bottle holder, of a pair of brushes, and means for shifting the brushes to bring them successively into alinement with the bottles whereby each bottle is subjected to a double washing.

19. In a bottle washing machine, the combination with a rotating main frame, of washing apparatus rotating therewith, a conveyer extending around said main frame, bottle holders carried by the conveyer, a series of spinners for rotating the bottles within their holders during their operation of washing, a driven member carried by each spinner, a common driving member having operative engagement with each driven member, and means for operating said various parts in properly timed relation.

20. In a bottle washing machine, the combination with a rotary main frame, of washing apparatus rotating with said main frame, bottle carriers traveling around said main frame, and means for subjecting the interior of the bottles to a washing during the uninterrupted travel of the conveyer.

21. In a bottle washing machine, the combination with a rotary main frame, washing apparatus rotating with said frame, bottle holders traveling around said frame, and means for washing the bottles and rinsing the bottles successively during the rotation of the holders around said frame.

22. In a bottle washing machine, the combination with a continuously rotating main frame, of a plurality of bottle holders, a pair of brushes rotating with said frame and means for alternating the position of said brushes at predetermined intervals.

23. In a bottle washing machine, the combination with a main frame, of a plurality of bottle holders traveling in a substantially horizontal plane, brushes for washing the bottles while in said holders, a plurality of rinsers mounted to move between the bottles and brushes, and means for horizontally shifting said rinsers into and out of alinement with the bottle holders.

24. In a bottle handling machine, the combination with a main frame, of a row of bottle holders traveling in a substantially horizontal plane, a plurality of rinsers, and means for horizontally shifting said rinsers into and out of alinement with the bottle holders at properly timed intervals.

HENRY J. CHILTON.

Witnesses:
 FRANK L. BELKNAP,
 ANNA O'BRIEN.